(12) United States Patent
Lippuner (10) Patent No.: US 8,546,745 B2
(45) Date of Patent: Oct. 1, 2013

(54) OPTOELECTRONIC POSITION MEASUREMENT DEVICE HAVING A GUIDED BEAM PATH IN THE INTERIOR OF A CODE CARRIER AND OPTOELECTRONIC POSITION MEASUREMENT METHOD

(75) Inventor: Heinz Lippuner, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 240 days.

(21) Appl. No.: 13/143,721

(22) PCT Filed: Feb. 1, 2010

(86) PCT No.: PCT/EP2010/051190
§ 371 (c)(1),
(2), (4) Date: Jul. 7, 2011

(87) PCT Pub. No.: WO2010/089280
PCT Pub. Date: Aug. 12, 2010

(65) Prior Publication Data
US 2011/0272566 A1    Nov. 10, 2011

(30) Foreign Application Priority Data
Feb. 3, 2009  (EP) ..................................... 09151945

(51) Int. Cl.
*G01D 5/34*   (2006.01)
(52) U.S. Cl.
USPC ..................................... 250/231.13; 250/239
(58) Field of Classification Search
USPC ................. 250/231.13, 227.11, 227.24, 239, 250/216; 341/11, 13; 356/373–375; 33/1 PT, 33/707, 354, 706, 762
See application file for complete search history.

(56) References Cited

U.S. PATENT DOCUMENTS

| 3,731,107 A | 5/1973 | Goodwin et al. |
| 3,752,974 A | 8/1973 | Baker et al. |
| 4,668,862 A | 5/1987 | Waibel |
| 6,240,652 B1 * | 6/2001 | Bobel et al. ..................... 33/707 |
| 7,145,127 B2 | 12/2006 | Chin et al. |

(Continued)

FOREIGN PATENT DOCUMENTS

| DE | 3641288 C1 | 6/1988 |
| DE | 19835972 C1 | 1/2000 |

(Continued)

OTHER PUBLICATIONS

European Search Report issued Jun. 10, 2009 as received in European patent application 09151945.4.

*Primary Examiner* — Que T Le
(74) *Attorney, Agent, or Firm* — Maschoff Brennan (57) ABSTRACT

An optoelectronic position measurement device having a code carrier that carries at least one optically registered position code and that is illuminated with optical radiation from a radiation source. At least one portion of the optical radiation is registered by at least one registration element, by means of which a signal dependent on the position code can be created and a position of the code carrier relative to the registration element can thus be registered. the code carrier is movable relative to the registration element with a degree of freedom. the optical radiation couples into the code carrier and is guided at least partially in a beam path in the interior of the code carrier lying in the extension level of the code carrier. The decoupling of the optical radiation occurs in a decoupling zone such that the registration element is illuminated by a substantially homogenous intensity distribution.

24 Claims, 10 Drawing Sheets

(56) References Cited

U.S. PATENT DOCUMENTS

2005/0147372 A1 7/2005 Boudelais et al.
2006/0268545 A1 11/2006 McCollum et al.
2007/0147221 A1 6/2007 Parriaux et al.

FOREIGN PATENT DOCUMENTS

| DE | 10 2006 047471 A1 | 4/2008 |
| EP | 1484582 A | 12/2004 |
| WO | 2001-040708 A2 | 6/2001 |

* cited by examiner

OPTOELECTRONIC POSITION MEASUREMENT DEVICE HAVING A GUIDED BEAM PATH IN THE INTERIOR OF A CODE CARRIER AND OPTOELECTRONIC POSITION MEASUREMENT METHOD

FIELD OF THE INVENTION

The invention relates to an optoelectronic position measuring device, and to an optoelectronic position measuring method.

BACKGROUND

There is a need to determine directions, angles and lengths as positions in many fields of application, such as in geodetic and industrial measurement, for example. Developments in angle measurement technology have led via mechanical reading operations as far as fully automated angle measurement in accordance with the current state of the art.

Known automated position measuring devices generally comprise a code carrier and a scanning device. In angle measuring devices, the code carrier is usually designed to rotate about an axis relative to the scanning device, in which case an angular position of the code carrier constitutes the variable to be measured. The coding carrier can, for example, have a graduation or coding for determining the position, it being possible to apply the coding to a surface or lateral surface of the coding carrier.

For the purpose of automatically detecting the position, the code carrier, which can be moved relative to the scanning device, is scanned by means of differing techniques. Known scanning methods are electronic-magnetic, electronic and optoelectronic methods. The following statements relate to optoelectronic scanning methods and scanning devices which have, in particular, an illumination device and a detector.

The coding is usually arranged in a full circle in order to determine, for example, angular positions from 0° to 360°. The angular resolution of the full circle is determined by the type of coding and the scanning device used to read the coding. Thus, for example, the angular resolution is increased by applying a code in a plurality of tracks, or by a finer graduation, the achievable resolution being limited for reasons of manufacturing and cost. Arrangements of one or more detectors, for example, are known for reading the code. CCD line arrays or CCD area arrays, for example, can constitute such detectors. The code can be formed by structuring a reflecting surface, or else by structuring a transilluminable material so that imaging is performed in transmission, reflection or in a combined method.

Swiss patent CH 658514 A5 discloses such a device for measuring an angular position. There, a mark whose position relative to a surface of sensors constitutes the variable to be measured is focused onto this surface. The output signals of the sensors are guided into an evaluation circuit that sequentially determines the distribution of the intensity of the signals generated by the sensors. The position of the mark in relation to the surface of sensors can be derived from the intensity distribution.

The dimensions of a position measuring device for geodetic units are advantageously to be kept small. In order to permit a design that is correspondingly small and not very complicated, the illumination device and the detector of the position measuring device have for some time been arranged on a common, electrically supplied printed circuit board and not, as in the past, above or below a code carrier, this being done in each case on a separate printed circuit board that was electrically supplied. In the case of position measuring devices of the prior art having a side-by-side arrangement of the detector and the illumination device, the emitted beams are deflected, for example, by a deflecting element having two planar, reflecting surfaces, so that an image of the code is produced on the detector by the code carrier arranged downstream in the beam path. In this case, the emitted beams can optionally be collimated by means of an optical system directly downstream of the illumination source.

By way of example, U.S. Pat. No. 7,145,127 B2 shows a deflecting element for a position measuring device, the deflecting element having two mutually aligned surfaces for double reflection of the emitted beams, and carrying a code that can be imaged onto a sensor, and thus additionally being formed as a code carrier.

One object of the invention is therefore to provide a position measuring device having a simplified design, as well as a position measuring method suitable herefor.

A further object is to reduce the size and to increase the robustness of the position measuring device.

These objects are achieved by implementing the characterizing features of the independent claims.

Features that develop the invention in an alternative or advantageous way are to be gathered from the dependent patent claims.

The invention is based on a fundamental variation in the beam path used to illuminate the position code. In accordance with a first partial invention, the beam guidance is displaced into the code carrier in this case. This first configuration of the code carrier, which is independent of the second invention, is also described in the European patent application with the application number 09151945.5, and defined in the claims, the disclosure of which is incorporated into this description by reference. In accordance with a second partial invention, which develops this first partial invention, the decoupling of the radiation from the code carrier is configured so as to perform illumination of a detecting element with homogeneous intensity.

In the prior art, the illumination of the position code is performed in accordance with transmitted light or reflected light methods by guiding the radiation onto the code carrier as perpendicularly as possible. Depending on the particular configuration, this requires deflecting elements or complicated beam paths, the result being that in addition to the size of the device required for this purpose, there is also an increased outlay on adjustment and a reduction in robustness. According to the invention, the radiation used for illumination is coupled into the code carrier itself and guided there at least in sections, the beam path lying at least partially in the plane of extent of the code carrier and, in most cases, also of the position code. This means that the propagation direction of the radiation and the optical axis of the beam path lie in this plane, thus enabling a flat design despite the use of a planar code carrier or of a code extended over an area or linearly. Beam guidance is preferably performed up to the position code itself, so that the latter is illuminated from out of the code carrier.

The materials glass or plastic used generally in the prior art can be used for this purpose as suitable code carrier materials in which beam guidance can be performed by reflection at the interfaces. However, it is also possible in principle to make use of cavities, for example made from metal, reflection being performed here at the inner surfaces.

For the application purpose of a goniometer or rotation encoder, it is possible, for example, to use a plastic circle or plastic ring with an impressed diffractive code such as is described in WO 2008/141817, for example. The illumination radiation is coupled through the narrow side into this plastic circle from inside or outside with the aid of a light source. The graduation representing the position code comprises alternately occurring disturbed and undisturbed parts on the surface of the disk, formed from diffractive, refractive, absorbing or reflecting structures. Consequently, the position code can, for example, be designed in reflection or transmission as a phase grating or amplitude grating. The receiver is provided as an area array or line array on the side of the circle on which the surface is partially disturbed or, given an appropriate design, also on the other side, a plurality of arrays and light sources being capable of use in order to determine or eliminate systematic errors such as, for example, eccentricity errors, or to increase the measuring accuracy. Such high-precision angle sensors are typically applied in geodetic measuring units or scanning measuring machines such as coordinate measuring units, for example.

SUMMARY

Owing to the at least partial beam guidance in the code carrier, it is possible to implement very flat and compact arrangements by coupling the radiation in from the side of the detector or in a fashion perpendicular thereto. By contrast with solutions in the prior art there is no longer any need hereby to perform beam guidance onto the side opposite the detector element. This configuration therefore also permits the arrangement of a radiation source, detector element and a driving and evaluation electronic system on a single carrier, for example a printed circuit board.

By contrast with arrangements of the prior art, which use the methods of reflected light or transmitted light, the problem of a nonuniform illumination of the position code arises owing to the beam guidance inside the code carrier. Thus, when the radiation is guided inside a code disk by means of total internal reflection (TIR) and the position code is located on one of the end faces of the code disk, said position code is illuminated obliquely such that the illumination is performed nonuniformly over the code surface. In addition, owing to the decoupling of light there is a reduction in the back reflection in the code carrier, which leads to a lesser intensity at subsequent points of the position code. The position code is illuminated nonuniformly, that is to say inhomogeneously, owing to these design-induced influences, and so the pixels or sensor points of a receiver element record different maximum intensities.

In accordance with the second invention, the illumination is homogenized in the region of the position code by an appropriate configuration of the decoupling zone. Two approaches can, for example, be followed to this end. Firstly, the decoupling level can be kept so low that the influence exerted on subsequent code sections by the decoupling in previous sections is negligible. However, this approach of weak decoupling imposes limits on the useful light quantity or requires strong sources or high receiver-side amplifications.

Secondly, the characteristic of the decoupling can be configured such that it is spatially dependent, in particular such that the optical radiation is decoupled so that the drop in the intensity occurring per length unit owing to the decoupling is compensated for the subsequent length unit. All the sensor points or pixels of the detecting element thereby receive the same light quantity. Radiation can in this case be influenced by a multiplicity of modifications of the code carrier or its surface in the region of the decoupling zone. This region can preferably be configured by means of diffractive or refractive microstructures, in particular by grating structures or prism structures.

The inventive arrangement, that is to say the configuration in accordance with the first or, additionally, also of the second partial invention, is here suitable both for rotation-measuring angle sensors and for measuring linear displacements. It can also be used both for systems that measure in absolute terms and for ones that measure in relative or incremental terms.

By way of example, suitable methods for producing suitable code carriers are available in the form of special contact methods, for example injection molding. It is thereby possible to produce code-carrying components or code carriers as special components made from plastic, as well, for example from polycarbonate; fast and simple reproduction methods are available for these. In particular, it is also possible to apply methods such as are customary in the field of the production of optical storage media, for example of compact disks (CDs).

The entrance window of the radiation and the surfaces used for beam-guidance can be polished in the case of the glass or plastic materials used. In addition, appropriate coatings can be applied to the code carrier in order to decrease or increase the reflectivity of the surface, that is to say for coupling in and subsequently for beam guidance in the interior of the code carrier.

BRIEF DESCRIPTION OF THE DRAWINGS

The inventive position measuring device and the position measuring method are described below in more detail or explained, purely by way of example, with the aid of exemplary embodiments illustrated schematically in the drawings of which, in detail:

FIG. 4-b shows an explanation of the design of an inventive position measuring device for the example of a goniometer;

DETAILED DESCRIPTION

Figure 1:
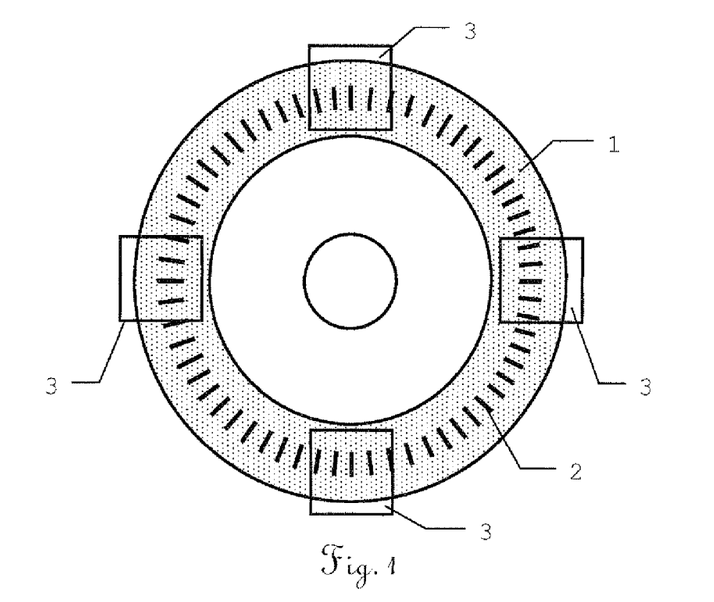
FIG. 1 shows an annular disk as code carrier having an optically detectable position code according to the prior art.

As a typical example of a position measuring device according to the prior art, FIG. 1 illustrates an annular disk as code carrier 1 having an optically detectable position code 2 for determining a rotational position. The code carrier 1 is designed as an annular segment and, for example, made from plastic, and has a concentrically arranged code track as position code 2. The white areas of the position code 2 are optically transparent, and the black areas are designed to be optically opaque. It is possible by illuminating a position-dependent part of the code carrier 1 to produce a shadow projection with coded information over the illuminated part of the code carrier 1, and thus with information related to a rotational position of the code carrier 1 relative to an illuminating radiation source that is shown in the following figures. In order to acquire the information, use is made for this purpose of a read head combination 3 composed of radiation source and detector, it also being possible to use a plurality of read head combinations 3 in order, for example, to determine or to remove errors.

Figure 2:
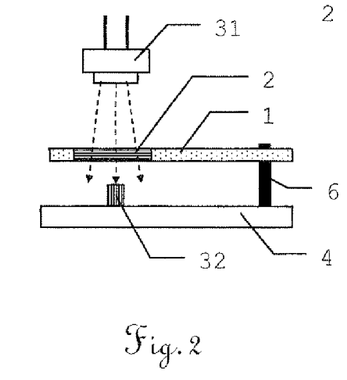
FIG. 2 shows a position measuring device of the prior art, illumination source and detector being arranged on different sides of the code carrier.

FIG. 2 shows a position measuring device of the prior art, radiation source 31 and a detector as detecting element 32 being arranged on different sides of the code carrier 1. In this example, use is made as radiation source 31 of an LED that emits optical radiation directly and without deflection onto the position code 2. The emitted radiation is illustrated by the dashed lines.

The code carrier 1 has position code 2, and is designed to be able to rotate about a rotation axis 6. In this typical arrangement of the prior art, although the beam path is of comparatively simple design, it is not possible to arrange both radiation source 31 and detecting element 32 on one and the same carrier structure, for example a printed circuit board 4.

Figure 3:
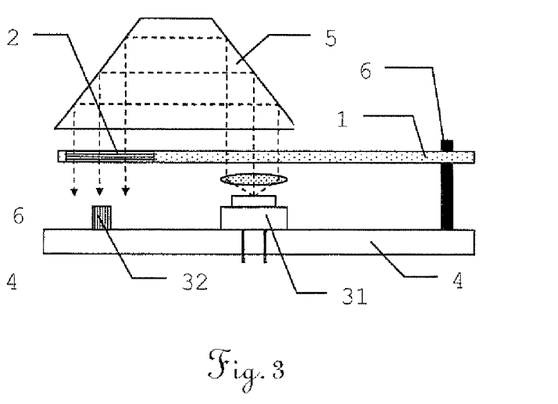
FIG. 3 shows a position measuring device of the prior art, radiation being deflected on the side of the code carrier opposite the illumination source and the detector.

FIG. 3 shows a position measuring device of the prior art, beam deflection being performed on the side of the code carrier 1 opposite the radiation source 31 and the detecting element 32. In this example, use is made as radiation source 31 of a laser diode that is arranged so that the emitted radiation is guided perpendicularly through or around the code carrier 1 and via a deflecting element 5 back again to the position code 2 and subsequently onto the detecting element 32. In this example, although both the radiation source 31 and detecting element 32 can be arranged on one and the same printed circuit board 4, there is a need on the opposite side of the code carrier 1 for a deflecting element 5 that directs the radiation back onto the position code 2.

Figure 4A:
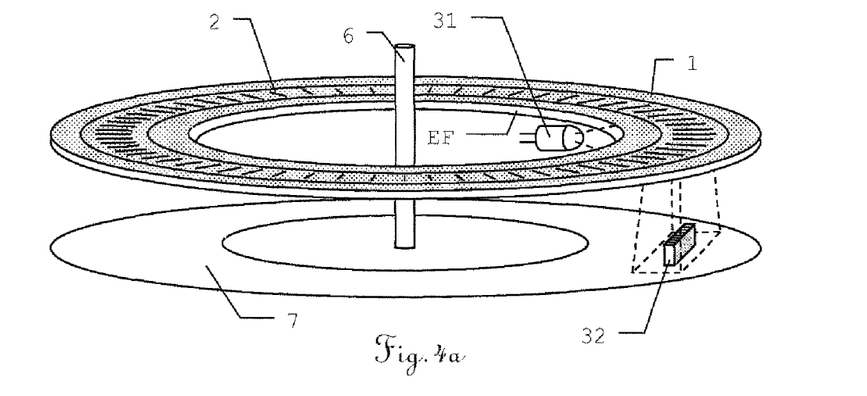
Figure 4B:
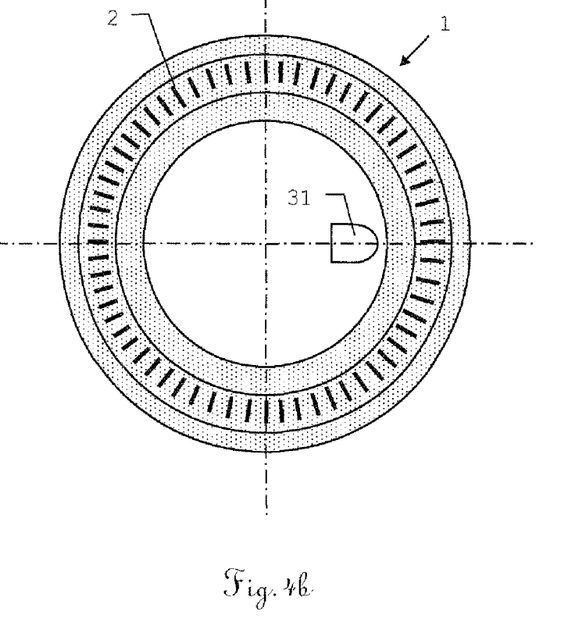

Both variant arrangements of the prior art prevent the components from being arranged in a flat and simple or robust fashion. An inventive design of a position measuring device that enables this to be done is shown for the example of a goniometer in FIGS. 4*a-b*, FIG. 4*a* showing a side view, and FIG. 4*b* a plan view.

The inventive optoelectronic position measuring device has a code carrier 1, whose geometry is annular and which has an optically detectable position code 2 and can be rotated in relation to a component carrying a line sensor as detecting element 32. The position code 2 can be designed, in particular, as diffractive code. For the purpose of illumination, use is made, for example, of a laser diode or an LED as radiation source 31 that has a diaphragm (not illustrated here) and emits optical radiation which is guided via the position code 2 onto the detecting element 32 for the reception of at least a portion of the optical radiation, the result being to enable a signal dependent on the position code to be generated, and thus a position of the code carrier 1 relative to the detecting element 32 to be detected. Depending on the design of the position measuring device or position code, it is, however, also possible here to make use of some other type of sensor, for example an area sensor or area array. The code carrier 1 can be moved relative to the detecting element 32 with one degree of freedom, that is to say can be rotated in this example about an axis 6. According to the invention, radiation source 31 and code carrier 1 are arranged and designed in such a way that the optical radiation is coupled into the code carrier 1 and is guided at least partially in the interior of the code carrier 1 in a beam path lying in the planar extent of the position code 2. The beam guidance can be performed in this case up to the position code 2 in the interior of the code carrier 1.

To this end, the code carrier 1 is formed from a material transparent to the optical radiation, in particular from glass or polycarbonate, so that the radiation can be guided in the interior of the code carrier material itself. In addition, it is also possible for beam-shaping and/or beam-deflecting elements to be integrated in the beam path on the surface or in the interior of the code carrier 1. In this example, the optical radiation is coupled into the code carrier radially from inside, that is to say via the narrow inner side of the ring, which serves as entrance window EF. According to the invention, the radiation can, however, also be coupled into the code carrier 1 from radially outside, into the lateral surface, or in an axial direction, through one of the end faces.

Optical elements can be integrated into the inner or outer edge of the ring or circle, or the edge can be designed in a fashion that is optically active and beam-changing. In particular, according to the invention it is possible to use imaging and deflecting elements such as, for example, lenses, reflective surfaces or diffractive elements.

Figure 5:
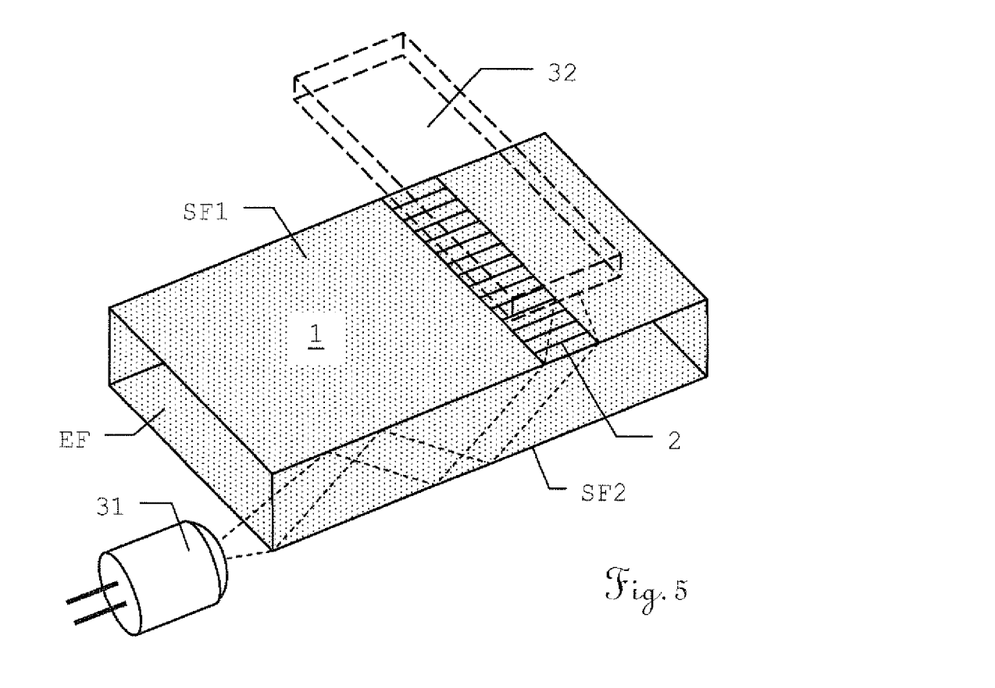
FIG. 5 shows an explanation of the basic principle of the beam guidance in an inventive position measuring device.

The basic principle of the beam guidance in an inventive position measuring device is explained in more detail in FIG. 5, the illustration shown being capable of relating both to the position measuring device, illustrated in FIGS. 4*a-b*, with angle measurement functionality, and to a position measuring device for determining linear displacements.

The radiation emitted by the radiation source 31 is coupled into the code carrier 1 via an entrance window EF, and reflected there in the interior by reflection onto the two end faces SF1 and SF2 oriented perpendicular to the entrance window, and guided up to the diffractively acting position code 2. The diffraction pattern of the latter is projected onto the detecting element 32, which is illustrated here only in outline. If a plurality of radiation sources 32 are used, the radiation can also be thoroughly mixed and therefore homogenized by the different angles of said sources with respect to the entrance window EF.

FIGS. 6-14 illustrate by means of a plurality of embodiments the arrangements of the detecting element 32 and radiation source 31 on the same side of the code carrier 1 in the manner made possible by the inventive configuration of the position measuring device.

Figure 6:
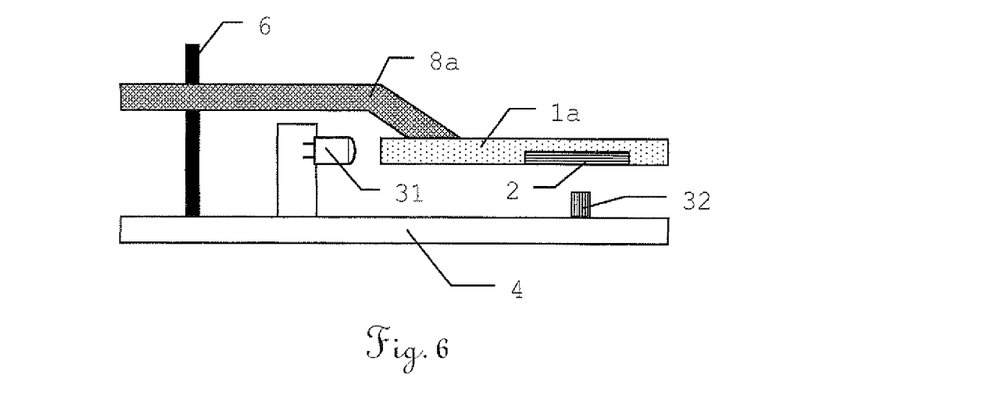
FIG. 6 shows a first embodiment of the arrangement of components in an inventive position measuring device.

FIG. 6 shows in this case a first embodiment of the arrangement of the components in an inventive position measuring device. The detecting element 32 and radiation source 31 are arranged here on a common printed circuit board 4, the radiation source 31 being, however, fastened on an extension arm so that its radiation is emitted parallel to the extent of the printed circuit board 4, and therefore can be coupled into the plane of the code carrier 1a. As in FIGS. 4a-b and 5, the latter is designed as a ring, the connection to the axis 6 being produced via a holder 8a, which offsets the mount upward, so that enough space remains for the radiation source 31.

Figure 7:
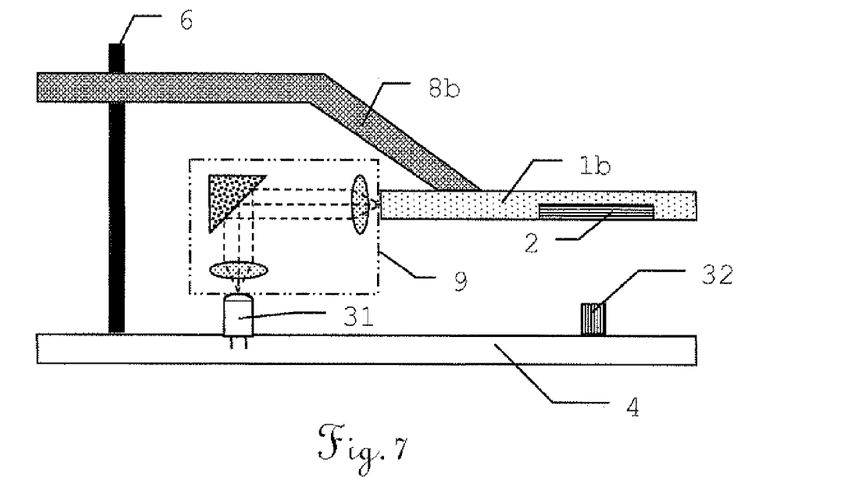
FIG. 7 shows a second embodiment of the arrangement of components in an inventive position measuring device.

A direct arrangement of the radiation source 31 and detecting element 32 on the printed circuit board 4 is shown in FIG. 7 for a second embodiment. Here, both components are mounted directly on the printed circuit board 4 such that the two exhibit an emitting or receiving direction perpendicular to the latter. The code carrier 1b is, in turn, connected to the axis 6 via a holder 8b offsetting the mount upward. However, the radiation is now coupled in by a deflecting beam guidance, it being possible to use an optical arrangement 9 that serves to collimate the beam, deflect it via a prism or a reflective surface, and refocus it subsequently.

Figure 8:
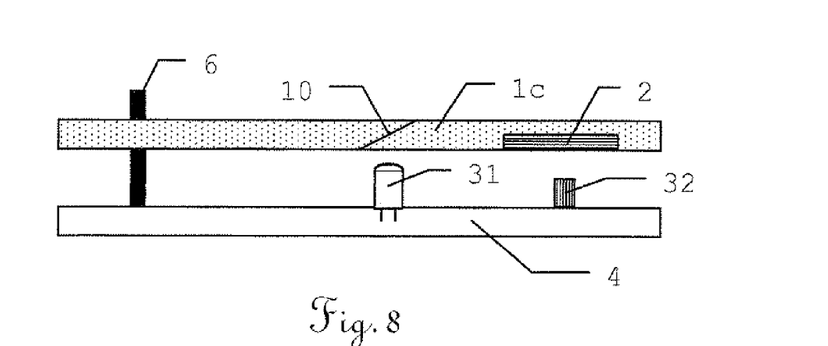
FIG. 8 shows a third embodiment of the arrangement of components in an inventive position measuring device.

An even flatter arrangement with a likewise direct fastening of the components on a common printed circuit board 4 is shown in FIG. 8 for a third embodiment. Here, the optical radiation is coupled into the code carrier 1c on the same side on which the detecting element 32 detects the projection, that is to say the coupling in is no longer performed through the inner side of the ring as entrance window, but makes use for this purpose of the lower end face, facing the printed circuit board 4, of the code carrier 1c, which is directly connected to the axis 6. The beam is deflected into the plane of extent of the code carrier 1c, and thus into the plane of movement thereof, by a deflecting element integrated into the code carrier 1c, in this case by a reflective interface 10. The latter can, for example, be produced by assembling the code carrier 1c from two parts made of identical material, it being possible to design the connecting surface as a bevel. In addition, said bevel can in this case further be coated so as to increase reflection. After entry into the code carrier 1c and deflection, the radiation is then guided into the plane of the movement and the plane of extent of the position code 2.

Figure 9:
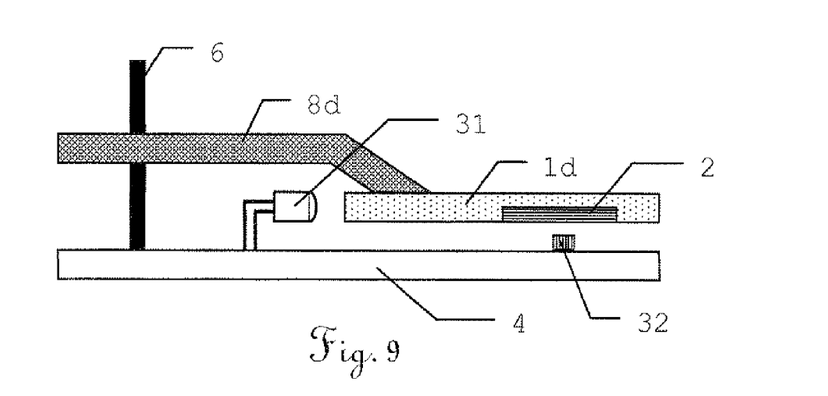
FIG. 9 shows a fourth embodiment of the arrangement of components in an inventive position measuring device.

In the case of the fourth embodiment, shown in FIG. 9, a laser diode or LED as radiation source 31 is arranged with angular contacts on the carrier plate 4 so that its emitting direction runs parallel to the carrier plate 4, and coupling can be performed into the plane of the code carrier 1d. In this example, the code carrier 1d is connected in turn via a holder 8d offsetting the mount or mounting plane upward with the axis 6.

Figure 10:
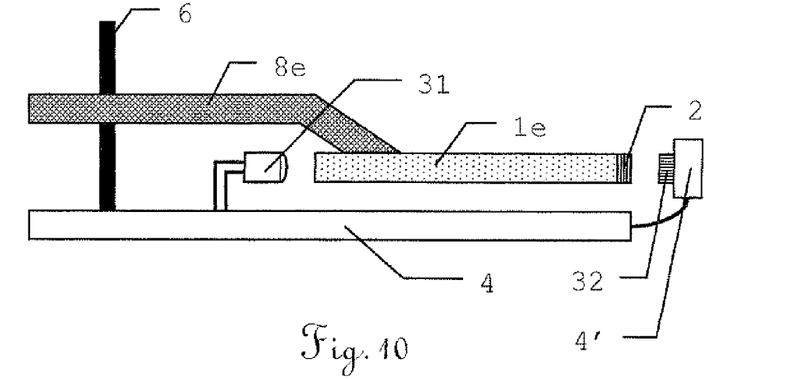
FIG. 10 shows a fifth embodiment of the arrangement of components in an inventive position measuring device.

A variant similar to the embodiment of FIG. 9 is illustrated in FIG. 10 as fifth embodiment, the detecting element 32 being arranged here so that its receiving direction likewise runs parallel to the printed circuit board 4 and in the plane of the code carrier 1e. To this end, the detecting element 32 can likewise be designed in a way similar to the radiation source 31 with angular contact elements or else, as in the example shown, be fitted on a dedicated printed circuit board 4' that is, in turn, arranged for its part in a fashion angled relative to the printed circuit board 4 carrying the radiation source 31. Because of the altered beam guidance with a beam path lying completely in the plane of the code carrier 1e, in this embodiment the position code 2 is arranged on the outer surface of the annular code carrier 1e. Again, the code carrier 1e is connected in turn to the axis 6 via an offsetting holder 8e.

Figure 11:
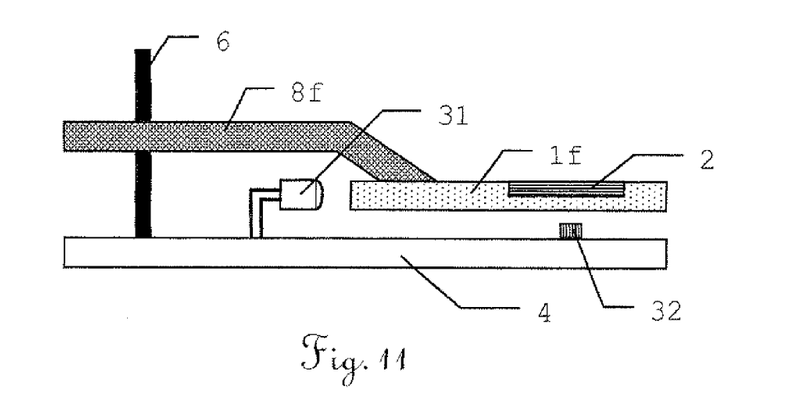
FIG. 11 shows a sixth embodiment of the arrangement of components in an inventive position measuring device.

FIG. 11 likewise shows, as a sixth embodiment, a variant similar to the embodiment of FIG. 9 and having an identical arrangement of radiation source 31 and detecting element 32 on the common printed circuit board 4. However, the position code 2 is arranged within the code carrier 1f on the side opposite the detecting element so that, before detection by the detecting element 32, the projection of the position code 2 is still guided within the material of the code carrier 1f, that is to say the detecting element 32 need not necessarily be mounted on the same side of the code carrier 1f as the position code 2.

Figure 12:
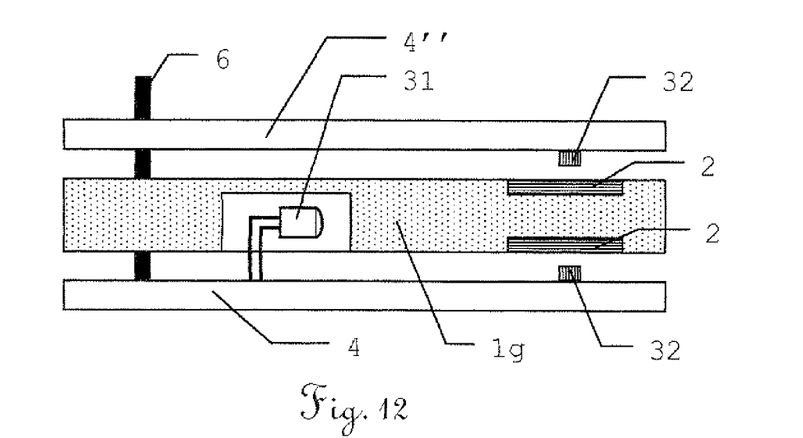
FIG. 12 shows a seventh embodiment of the arrangement of components in an inventive position measuring device.

A seventh embodiment of the arrangement of components with an additional printed circuit board 4" is illustrated in FIG. 12. In this embodiment, the radiation source 31 is fastened, in a way corresponding to FIGS. 9-11, on a printed circuit board 4 that also carries a detecting element 32. A second detecting element 32 is fastened with an opposing receiving direction on a second printed circuit board 4", the latter running parallel to the first printed circuit board 4 and forming with the latter a common fixed reference system with respect to the code carrier 1g. The two detecting elements 32 are arranged here opposite one another, that is to say with receiving directions directed one against another. The radiation source 31 is positioned in a groove or channel of the code carrier 1g so that it continuously emits to the outside in the interior of the code carrier, thus into the material of the code carrier 1g via the inner surface of the groove. Said code carrier 1g now has, at the two opposite end faces, two position codes 2 of the same type, although it is also possible to make use, according to the invention, of code types differing fundamentally. In this example, both position codes 2 and detecting elements 32 are respectively arranged at the same spacing from the fulcrum. Errors, for example axial errors or a tilting of the code carrier 1g, can be determined by a double design of this kind. By way of example, depending on the tilting direction and position of the detecting elements 32 with respect to the tilting axis, such an error would lead to an oppositely directed displacement of the radial position or the angular position of the imaged code, from which it is then also possible to determine the tilt. In addition, the use of two detecting elements 32 can also be used to increase accuracy, for example by forming the average of the two rotational positions.

Figure 13:
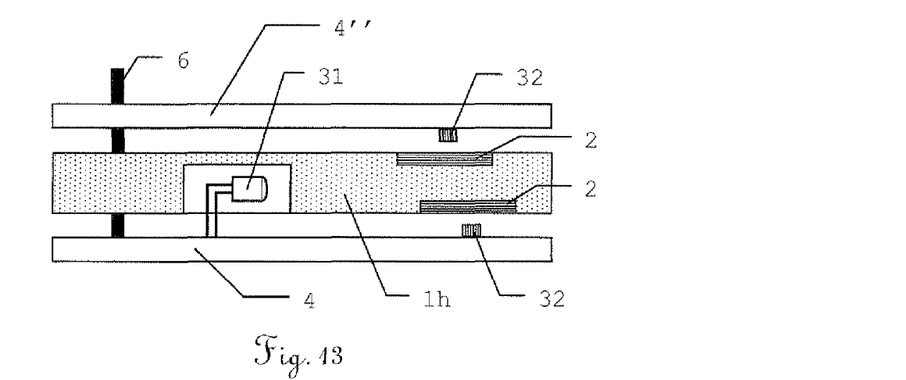
FIG. 13 shows an eighth embodiment of the arrangement of components in an inventive position measuring device.

A similar, eighth embodiment is illustrated in FIG. 13. Given a design that is fundamentally the same as the example from FIG. 12, the two position codes 2 are now arranged at different spacings from the fulcrum or from the center of the code carrier 1h, and this can likewise be used to compensate errors or to increase accuracy.

When use is made of a broadband radiation source 31, for example a white LED, it is possible with the aid of one or more detecting elements 32 with different spectral characteristics to perform a multiple evaluation, for example by also employing as position codes 2 gratings appropriately adapted to a specific wavelength. Such a spectral sensitivity can be effected, for example, by filters on an area array as detecting component 32. By the multiple use of position code 2 and detecting component 32, the seventh and eight embodiments permit a tuned design of the individual components for different wavelengths or wavelength regions so that a plurality of measurements are possible.

Figure 14:
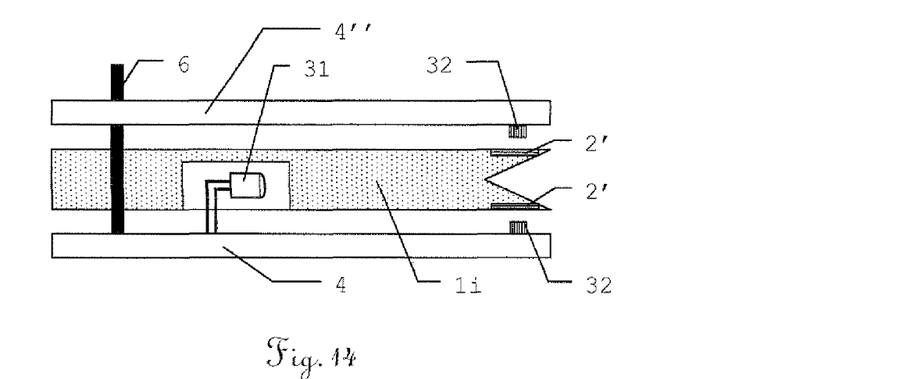
FIG. 14 shows a ninth embodiment of the arrangement of components in an inventive position measuring device.

FIG. 14 shows a ninth embodiment designed similar to the seventh and eighth embodiments and with an identical arrangement of printed circuit boards 4 and 4", as well as of the radiation source 31 and two detecting elements 32. However, the outer edge of the code carrier 1i is provided with two oblique surfaces angled toward one another which have an angle of, for example, 45° to the upper and lower end faces, respectively, of the code carrier 1i. The radiation emitted by the radiation source 31 is split between these two surfaces and guided via the position codes 2' to the respectively assigned detecting element 32. In addition to a continuous and periodic amplitude grating, it is also possible for the position codes 2' to be designed, for example, as a discontinuous amplitude grating.

Different variants of the inventive beam guidance are explained in FIGS. 15-21 in a purely exemplary fashion.

Figure 15:
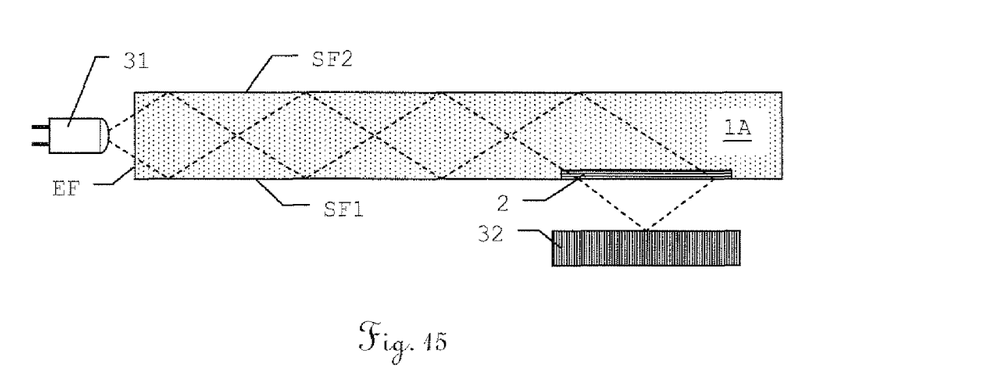
FIG. 15 shows a first embodiment of the beam guidance in an inventive position measuring device.

FIG. 15 shows a first embodiment of the beam guidance in an inventive position measuring device which corresponds to the example illustrated in FIG. 4-b. The radiation emitted by the radiation source 31 is coupled into the code carrier 1A via an entrance window EF oriented perpendicular to the emitting direction, and reflected there at the end faces SF1 and SF2. Owing to the reflections, the radiation is guided in the plane of extent from the position code 2 or code carrier 1A up to the position code 2, and projected there onto the detecting element 32.

Figure 16:
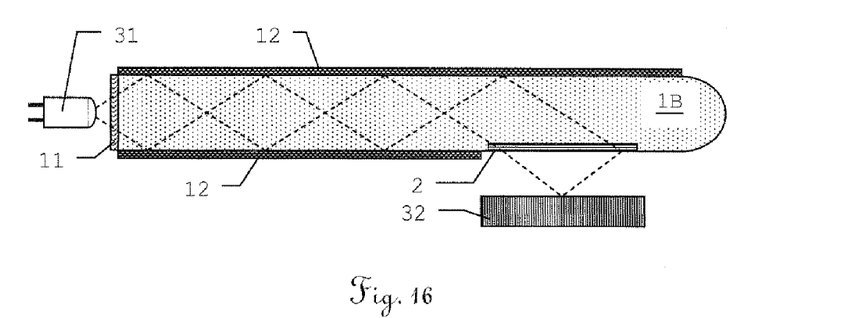
FIG. 16 shows a second embodiment of the beam guidance in an inventive position measuring device.

A similar design is shown by a second embodiment, illustrated in FIG. 16, of the beam guidance, in the case of which a transmission-increasing layer 11 is applied to the entrance window of the code carrier 1B in order to improve the coupling in of the radiation. In addition to the reflection-improving polishing of surfaces, it is also possible for reflection-increasing layers 12 to be arranged on the end faces so that the beam guidance in the interior of the code carrier 1B is improved. In addition, such layers can effect further properties, for example they can increase the abrasion resistance or scratch resistance of the code carrier 1B. Again, the use of layers is not restricted to this variant, and further layers can be used to support the beam guidance, an example being a transmission-increasing layer (not illustrated here) as exit window for decoupling the radiation in the region of the position code 2. Moreover, in this example the surface opposite the entrance window is not designed to be rectangular, but to be rounded and with the function of a lens, it being possible hereby to perform a second beam guidance, for example in order to decouple scattered light so as to control the radiation source 31.

Figure 17:
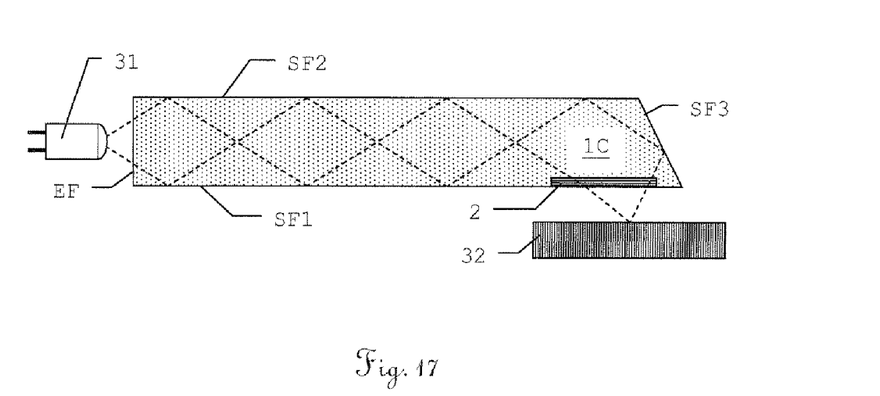
FIG. 17 shows a third embodiment of the beam guidance in an inventive position measuring device.

FIG. 17 shows a third embodiment of the beam guidance in an inventive position measuring device having a deflecting element integrated into the code carrier SF2. To this end, a reflection is effected at an inclined boundary surface opposite the entrance window EF, a bevel SF3 being provided for this purpose in this example on the outer surface of the code carrier 1C. Owing to this bevel, at least a portion of the radiation is deflected and guided onto the position code 2 as well as onto the detecting element 32. However, in addition to the formation of a bevel SF3 it is also possible to make use of other optically active elements or configurations of edge surfaces or internal structures, for example as a prism or by the introduction of a reflecting layer into the material of the code carrier 1C.

Figure 18:
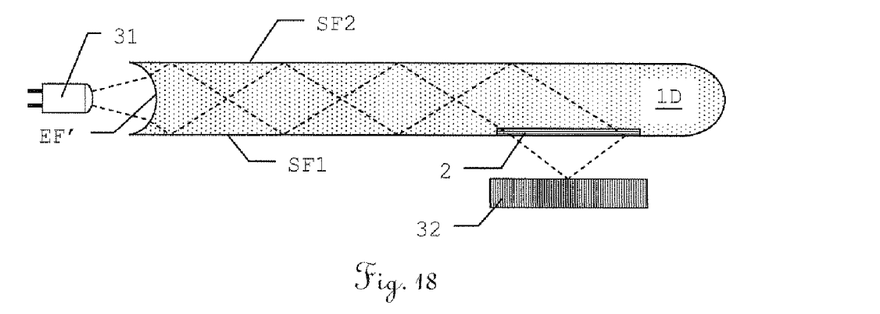
FIG. 18 shows a fourth embodiment of the beam guidance in an inventive position measuring device.

A fourth embodiment of the beam guidance with a specifically shaped entrance window EF' as a divergence-changing element is illustrated in FIG. 18. In order to effect an optimized coupling in and beam guidance in the code carrier 1D, it can be advantageous when the entrance window EF' has a beam-influencing, in particular divergence-changing action. This can, for example, be achieved by designing a lens shape and thus also a lens function such that a greater freedom is obtained in the positioning of the radiation source 31, or it is possible to dispense with otherwise possibly necessary optics upstream of the radiation source 31. In addition to the formation of a lens structure in or downstream of the entrance window EF', it is also possible for this purpose to make use of a diffractive structure that, for example, is applied directly to the surface of an otherwise planar entrance window.

Figure 19:
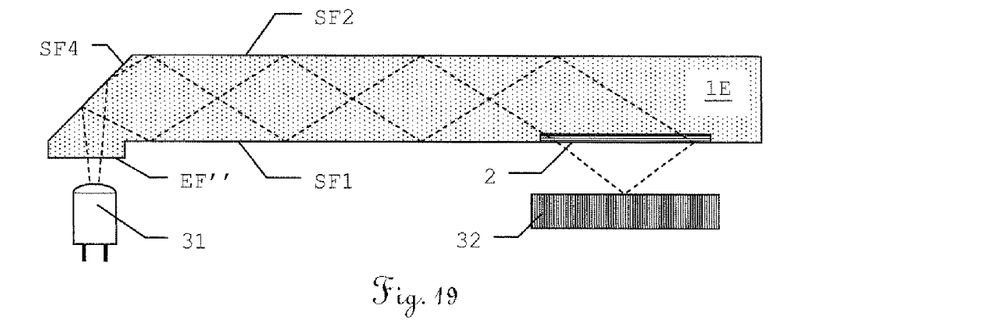
FIG. 19 shows a fifth embodiment of the beam guidance in an inventive position measuring device.

FIG. 19 shows a fifth embodiment of the beam guidance in an inventive position measuring device in the case of which coupling in is performed in a fashion perpendicular to the plane of extent of the code carrier 1E or to the plane of the positioning code 2. In this example, the code carrier 1E is angled at its coupling-in end so that the entrance window EF" is oriented parallel to the end faces SF1 and SF2. The radiation is therefore coupled in through the entrance window EF" in a fashion perpendicular to the end face SF1 and SF2, and must subsequently have its propagation direction changed by a deflecting element that is formed here as a bevel SF4, for example. This arrangement has the advantage that, as also shown in FIGS. 6 and 8—both the radiation source 31 and the detecting element 32 can be arranged on a printed circuit board as common carrier component.

Figure 20:
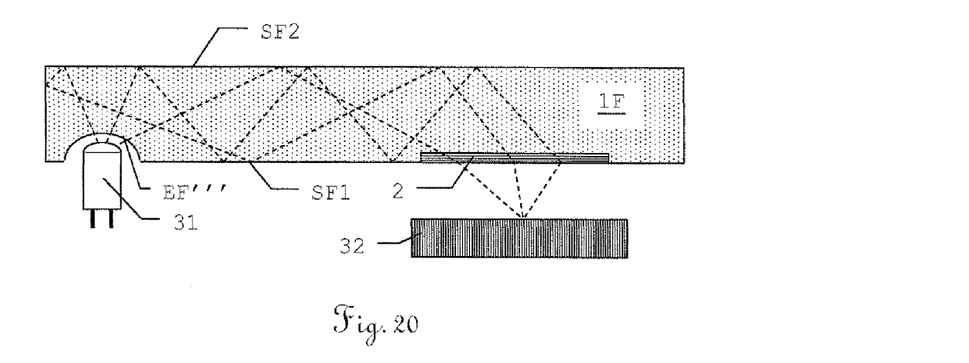
FIG. 20 shows a sixth embodiment of the beam guidance in an inventive position measuring device.

The same advantage is offered by the sixth embodiment, shown in FIG. 20, of the beam guidance in an inventive position measuring device. Here, the deflecting action is effected by reflections at the inner side, parallel to the coupling-in direction, of the code carrier 1F, and also at an end face SF2. In addition, the entrance window EF''' is designed with a cambered surface, thus producing a lens effect.

Figure 21:
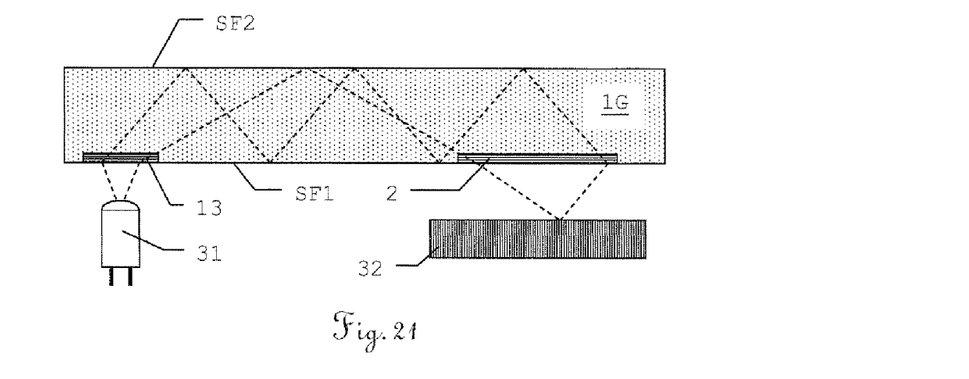
FIG. 21 shows a seventh embodiment of the beam guidance in an inventive position measuring device.

FIG. 21 shows a seventh embodiment of the beam guidance in an inventive position measuring device, in the case of which there is used as entrance window a diffractive structure 13 which can be used to influence the beam virtually as desired. In this example, there is a direct deflection from the coupling-in direction, which is perpendicular to the plane of the position code 2, into just this plane or the plane of extent of the code carrier 1G.

Figure 22:
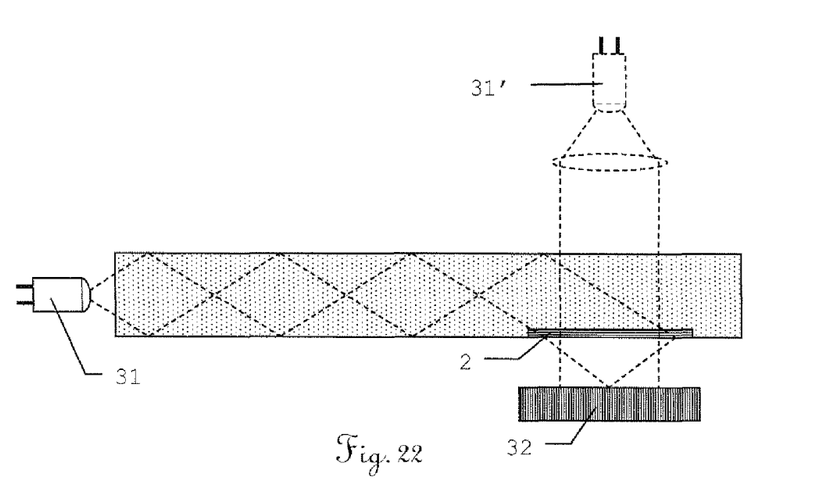
FIG. 22 is a schematic of the decoupling problems in the case of an inventive beam guidance in the code carrier.

FIG. 22 is a schematic of the decoupling problem in the case of an inventive beam guidance in the code carrier. As for the first embodiment, shown in FIG. 15, of the beam guidance in an inventive position measuring device, the decoupling of the optical radiation is performed perpendicular to the plane of extent of the code carrier, the decoupling zone coinciding spatially with the position code in this example and having an extent of 3 mm, for example. Here, the optical radiation is likewise guided in the code carrier by total internal reflection. In other embodiments, the decoupling zone and position code 2 can, however, also not coincide spatially, for example when the position code 2 is arranged in the interior of the code carrier and the decoupling takes place via the end face. Solutions of the prior art make use of the illumination, illustrated here by dashes, of the position code 2 by a radiation source 31' arranged opposite the detecting element 32, as a result of which the beam guidance is performed in a fashion substantially perpendicular to the extent of the position code 2 and, in particular on the basis of the collimation illustrated here by way of example, there is a homogeneous and structure-free illumination of the position code 2, and thus also of the decoupling zone. Given a beam guidance implemented in accordance with the first partial invention in the interior of the code carrier, however, the optical radiation is incident laterally and obliquely in relation to the position code or the decoupling zone, as a result of which a spatially dependent different illumination can already result. Depending on the positioning of the radiation source 31, a multiplicity of reflections occur at the walls of the code carrier and also occur in the region of the position code 2 or the decoupling zone. However, the decoupling of radiation or light in this region reduces the intensity, and so the subsequent region of the position code 2 is more weakly illuminated. In accordance with the second partial invention, the optical radiation is guided onto the detecting element 32 via a decoupling in a decoupling zone, the optical radiation being decoupled such that the detecting element 32 is illuminated with a substantially homogeneous, that is to say uniform and structure-free intensity distribution.

Figure 23:
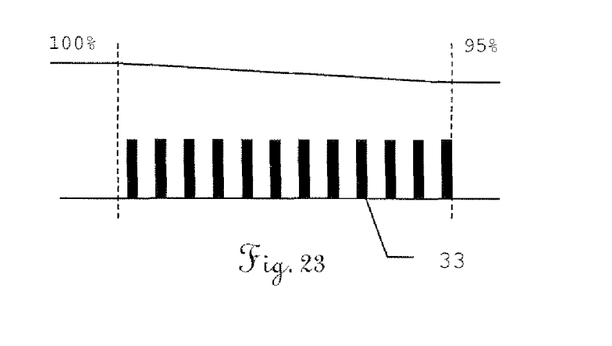
FIG. 23 is a schematic of the inventive principle of weak decoupling.

A first inventive option for homogenization is the principle of weak decoupling illustrated schematically in FIG. 23. Here, the portion of the optical radiation decoupled in the decoupling zone is kept so small that the light quantity gathered per sensor point is substantially the same, something which is shown by the amplitudes 33, illustrated here, of the individual sensor points, and the result is a substantially linear decoupling characteristic within the decoupling zone. In this example, then, only 5% of the initially present light energy is decoupled in the region of the decoupling zone, and so substantially the same light quantity is guided onto the receiving element per unit of length. Such decoupling can be achieved, for example, by a diffractive or refractive surface structuring that is uniform and therefore constant over the decoupling zone.

Figure 24:
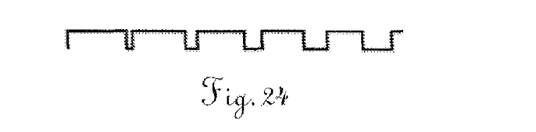
FIG. 24 shows a first embodiment of a structure for implementing the inventive strong decoupling.
Figure 25:
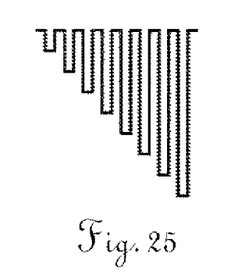
FIG. 25 shows a second embodiment of a structure for implementing the inventive strong decoupling.
Figure 26:
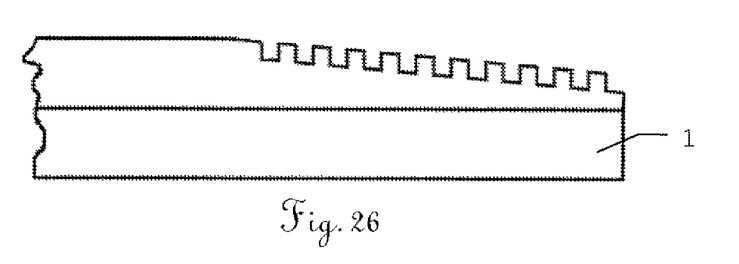
FIG. 26 shows a third embodiment of a structure for implementing the inventive strong decoupling.

A second inventive option for homogenization is the principle of strong decoupling shown in FIGS. 24-26 for a few exemplary implementations. Here, the decoupling is configured such that it has a spatially dependent characteristic. In particular, the optical radiation can be decoupled so that the drop in the intensity occurring per length unit owing to the decoupling is compensated for the subsequent length unit. Various techniques are available for this. Thus, a spatially dependent increase or decrease in absorption, reflectivity or transmissivity can occur in the region of the decoupling zone, for example because there the code carrier has a spatially dependent layer that changes the absorption or transmission, or because the spatial dependence is effected in the decoupling zone by a plurality of layers of different absorption or transmission. Thus, by way of example, layers of different thickness can be applied to the code carrier, wherein the thickness of the layers, when seen from the light source, decreases and the transmission increases. It is hereby possible to provide, for the respective rows of sensor points in an array, strips of varying transmission that therefore likewise lead to a spatial dependence.

In addition, amplitude holograms or modulations of the refractive index can also be used, it being possible to modulates the refractive index of a layer, arranged on the code carrier, in order to produce a volume grating. In particular, the decoupling zone can have refractive and/or diffractive microstructures such as, for example, microprisms, gratings or other gradient optical structures. In particular, the position code can itself be formed by means of these microstructures, so that the code and homogenization functions coincide spatially and are preferably implemented by the same structures. In this case, the spatial decoupling of light as a bright zone constitutes one of two code elements, whereas the absence of the decoupling acts as a dark zone, and thus as the other code element. It follows that the decoupling implements a type of code bar, that is to say in this case the decoupling itself implements the code pattern. Alternatively, however, a position code can also be formed independently of the decoupling, for example as a stripe pattern or diffractive code, it then being possible for the decoupling zone to be configured in turn homogeneously and without spatially dependent variability in the coding direction.

FIG. 24 shows a first embodiment of a structure for implementing the inventive strong decoupling, a structural width of the microstructures being modulated in the decoupling zone in a fashion perpendicular to the direction of the decoupling. In this example, the decoupling is performed upward and in a fashion perpendicular to the structural extent and, given an identical periodicity length, the length of the raised structure decreases from left to right in relation to the depression, and so the mark-space ratio is modulated.

In the case of the second embodiment of a structure for implementing the inventive strong decoupling in FIG. 25, a structural width of the microstructures is modulated in the decoupling zone in the direction of the decoupling, that is to say upward in the figure and in a fashion perpendicular to the horizontal course of the grating structure. In particular, it is possible here for the grating depth as a depression introduced into the substrate to be raised from left to right so that the decoupling level for the residual radiation present is increased in a spatially dependent fashion.

Finally, FIG. 26 shows a third embodiment of a structure for implementing the inventive strong decoupling, in the case of which a spacing of the microstructures from the beam path in the interior of the code carrier 1 is modulated in the decoupling zone, here, as well, the decoupling being performed in a fashion perpendicular to the extent of the code carrier 1, and upward in the figure. In this example, the microstructures as such are of similar design and their dimensions or shape are not spatially dependent, but the spacing from the beam path guided in the code carrier 1 decreases from left to right, that is to say from inside to outside with reference to a disk-shaped code carrier 1.

The variation in structural dimensioning in the direction of the decoupling or perpendicular thereto can also be combined, this also being valid as well for the combination with the variation in the spacing in relation to the beam guidance. Thus, by way of example, for a disk-shaped code carrier it is possible to design in the decoupling zone prisms having a size increasing radially outward, the prism structures possibly being designed as circumferential channels independent of the code structure, or as code itself. In this case, as a structure decoupling light or radiation the prisms constitute one of the coding elements whereas, in the absence of any decoupling the zones embody the respective other element.

It goes without saying that these illustrated figures represent only examples and selected aspects of possible embodiments. In particular, various elements can be combined with one another in other combinations. Thus, for example, it is possible to use coatings or diffractive structures in all arrangements, or else to implement more complex cases of beam guidance with multiple deflection or beam shaping in accordance with the invention. Likewise, the code carriers, detecting elements or decoupling zones shown, as well as their relative orientation are to be understood as being merely schematic and exemplary. In all variants, it is likewise possible to use sensor components that are of linear or two-dimensional design and have various orientations tuned to the shape and direction of movement of the code carrier.

What is claimed is:

1. An optoelectronic position measuring device, comprising:
   a code carrier, having at least one optically detectable position code;
   a radiation source for emitting optical radiation; and
   at least one detecting element with sensor points for receiving at least a portion of the optical radiation, as a result of which a signal dependent on the position code can be generated, and therefore a position of the code carrier relative to the detecting element can be detected, wherein:

the code carrier being movable relative to the detecting element with one degree of freedom;

the radiation source and the code carrier being arranged and designed in such a way that the optical radiation is coupled into the code carrier and is guided up to the position code at least partially in a beam path, in the interior of the code carrier, lying in the plane of extent of the code carrier, and is guided onto the detecting element by being decoupled in a decoupling zone; and the decoupling of the optical radiation is performed so that the detecting element is illuminated at a substantially homogeneous intensity distribution.

2. The optoelectronic position measuring device as claimed in claim 1, wherein a component of the optical radiation that is coupled out in the decoupling zone is so small that the light quantity gathered per sensor point is substantially the same, and the result is a substantially linear decoupling characteristic within the decoupling zone.

3. The optoelectronic position measuring device as claimed in claim 1, wherein the decoupling has a spatially dependent characteristic.

4. The optoelectronic position measuring device as claimed in claim 3, wherein the decoupling zone has refractive and/or diffractive microstructures.

5. The optoelectronic position measuring device as claimed in claim 4, wherein a structural width of the microstructures is modulated in the decoupling zone in a fashion perpendicular to the decoupling-direction, in particular the mark-space ratio being modulated.

6. The optoelectronic position measuring device as claimed in claim 5, wherein the mark-space ratio being modulated.

7. The optoelectronic position measuring device as claimed in claim 4, wherein a structural width of the microstructures is modulated in the decoupling zone in the decoupling-direction, in particular a grid depth being modulated.

8. The optoelectronic position measuring device as claimed in claim 7, wherein a grid depth being modulated.

9. The optoelectronic position measuring device as claimed in claim 4, wherein a spacing of the microstructures in relation to the beam path in the interior of the code carrier is modulated in the decoupling zone.

10. The optoelectronic position measuring device as claimed in claim 3, wherein a refraction index, in particular the refraction index of a layer arranged as volume grating on the code carrier, is modulated in the decoupling zone.

11. The optoelectronic position measuring device as claimed in claim 3, wherein the refraction index of a layer arranged as volume grating on the code carrier is modulated in the decoupling zone.

12. The optoelectronic position measuring device as claimed in claim 3, wherein the decoupling zone has an amplitude hologram.

13. The optoelectronic position measuring device as claimed in claim 3, wherein the decoupling zone has at least one layer which varies the absorption or transmission in a spatially dependent fashion, or the spatially dependent characteristic is effected in the decoupling zone by a plurality of layers of different absorption or transmission.

14. The optoelectronic position measuring device as claimed in claim 3, wherein the optical radiation being decoupled so that the drop in the intensity occurring per length unit owing to the decoupling is compensated for the subsequent length unit.

15. The optoelectronic position measuring device as claimed in claim 4, wherein the position code itself being formed by means of the microstructures.

16. The optoelectronic position measuring device as claimed in claim 1, wherein the optical radiation is decoupled in a fashion perpendicular to the plane of extent of the code carrier.

17. The optoelectronic position measuring device as claimed in claim 1, wherein the optical radiation is guided in the code carrier by total internal reflection.

18. The optoelectronic position measuring device as claimed in claim 1, wherein the code carrier has an annular or disk-shaped geometry, in particular the optical radiation being coupled radially into the code carrier from inside or outside.

19. The optoelectronic position measuring device as claimed in claim 1, wherein the radiation source includes an LED or laser diode.

20. The optoelectronic position measuring device as claimed in claim 1, wherein the at least one detecting element with sensor points for receiving at least a portion of the optical radiation includes a line sensor or two-dimensional sensor.

21. The optoelectronic position measuring device as claimed in claim 1, wherein the code carrier being movable relative to the detecting element with one degree of freedom in a rotational or translational fashion.

22. An optoelectronic position measuring method for determining a position of a code carrier that carries at least one position code and is movable relative to at least one detecting element with one degree of freedom, comprising:

generating a projection, dependent on the position of the code carrier, of a part of the projection code on the detecting element, the generating including:
emitting optical radiation onto the position code; and
detecting the projection by the detecting element; and
deriving the position of the code carrier relative to the detecting element from the projection, the optical radiation being:
coupled into the code carrier;
guided at least partially in a beam path, in the interior of the code carrier, lying in the planar extent of the code carrier, in particular being guided up to the position code; and
decoupled onto the detecting element in a decoupling zone,
wherein the optical radiation is decoupled so that the detecting element is illuminated at a substantially homogeneous intensity distribution.

23. The optoelectronic position measuring method as claimed in claim 22, wherein the optical radiation with a spatially dependent characteristic is coupled out so that the drop in the intensity occurring per length unit owing to the decoupling is compensated for the subsequent length unit.

24. The optoelectronic position measuring method as in claim 22 for determining an angle or a length of the code carrier that carries at least one position code and is movable relative to at least one detecting element with one degree of freedom in a rotational or translational fashion.

* * * * *

UNITED STATES PATENT AND TRADEMARK OFFICE
CERTIFICATE OF CORRECTION

PATENT NO.       : 8,546,745 B2                                              Page 1 of 1
APPLICATION NO. : 13/143721
DATED            : October 1, 2013
INVENTOR(S)      : Heinz Lippuner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 167 days.

Signed and Sealed this

Fifteenth Day of September, 2015

Michelle K. Lee
*Director of the United States Patent and Trademark Office*